(12) United States Patent
Philipp et al.

(10) Patent No.: US 10,301,117 B2
(45) Date of Patent: May 28, 2019

(54) CONVEYER BELT

(71) Applicant: ROTZINGER AG, Kaiseraugst (CH)

(72) Inventors: Kurt Philipp, Grenzach-Wyhlen (DE);
Matthieu Weigel, Guebwiller (FR);
Christian Muller, Berrwiller (FR)

(73) Assignee: ROTZINGER AG, Kaiseraugst (CH)

( * ) Notice: Subject to any disclaimer, the term of this patent is extended or adjusted under 35 U.S.C. 154(b) by 0 days.

(21) Appl. No.: 15/774,059

(22) PCT Filed: Nov. 3, 2016

(86) PCT No.: PCT/EP2016/076528
§ 371 (c)(1),
(2) Date: May 7, 2018

(87) PCT Pub. No.: WO2017/080902
PCT Pub. Date: May 18, 2017

(65) Prior Publication Data
US 2018/0327188 A1    Nov. 15, 2018

(30) Foreign Application Priority Data
Nov. 12, 2015    (CH) ...................................... 1645/15

(51) Int. Cl.
*B65G 23/44*    (2006.01)
*B65G 21/06*    (2006.01)
*B65G 21/14*    (2006.01)

(52) U.S. Cl.
CPC ............. *B65G 21/06* (2013.01); *B65G 21/14* (2013.01); *B65G 23/44* (2013.01); *B65G 2201/02* (2013.01)

(58) Field of Classification Search
CPC ................................ B65G 23/44; B65G 15/64
USPC .................................................. 198/807, 813
See application file for complete search history.

(56) References Cited

U.S. PATENT DOCUMENTS

| 3,770,108 | A | * | 11/1973 | Ettel | ................... B21C 47/3425 |
| | | | | | 198/807 |
| 5,503,265 | A | * | 4/1996 | Hussar | ..................... D01D 7/00 |
| | | | | | 198/807 |
| 2011/0005904 | A1 | * | 1/2011 | Ricciardi, Sr. | ......... B65G 23/44 |
| | | | | | 198/807 |
| 2013/0062167 | A1 | | 3/2013 | Alotto | |
| 2013/0206549 | A1 | * | 8/2013 | Clevers | ................ G03G 15/167 |
| | | | | | 198/807 |

FOREIGN PATENT DOCUMENTS

| EP | 0 114 155 A1 | 7/1984 |
| EP | 1 329 399 A2 | 7/2003 |
| FR | 2 663 309 A1 | 12/1991 |

OTHER PUBLICATIONS

International Search Report dated Feb. 2, 2017 in PCT/EP2016/076528 filed Nov. 3, 2016.

* cited by examiner

*Primary Examiner* — James R Bidwell
(74) *Attorney, Agent, or Firm* — Oblon, McClelland, Maier & Neustadt, L.L.P.

(57) ABSTRACT

The control belt has an endless web and a drive drum which drives the web and is arranged within the web silhouette perpendicular to the web running direction. Its shaft is mounted in bearings on both sides of the belt. The shaft bearings can be moved vertically and are connected to a drive for moving them vertically.

4 Claims, 1 Drawing Sheet

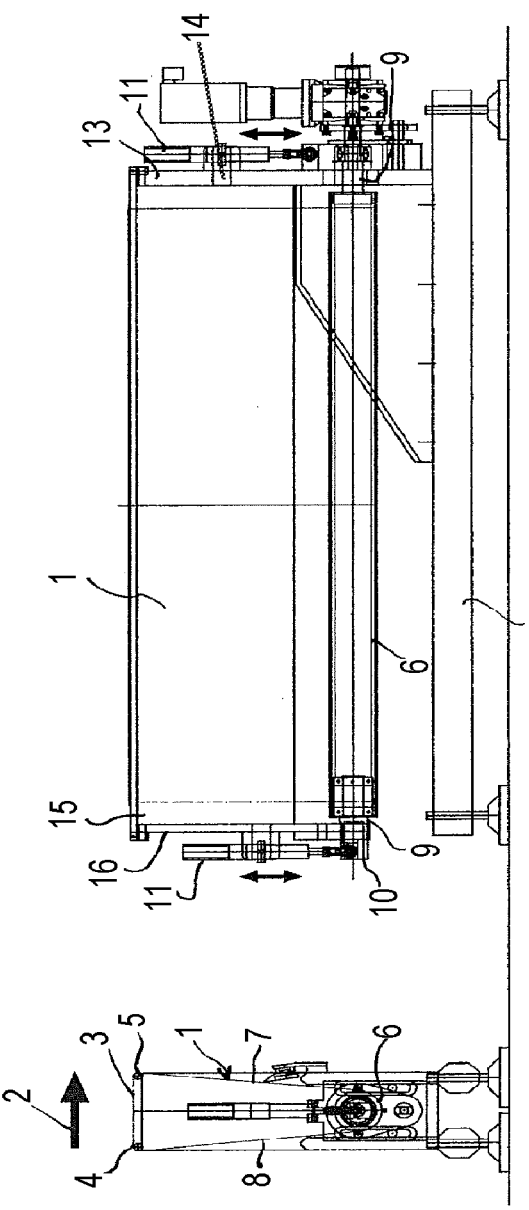

CONVEYER BELT

BACKGROUND

In the relevant technical language, the term "belt" is on the one hand understood to mean the circulating belt in a belt conveyor and, on the other, a complete belt conveyor device. For the purpose of this description, the term "belt" is used for conveyors while the term "web" is used for the actual belt circulating in the conveyor.

Functional belts are belts which fulfill other functions as well as the conveyor function. At the same time, functional belts are main belts, i.e. wide belts which correspond to the width of the production process. One form of functional belts is so-called control belts which are usually of very short design in the range between 100 mm and 400 mm in length.

Control belts are very often positioned at the beginning of a feed system and are used for the correct functional transfer of freshly produced rows of product. The feed system receives the freshly produced rows of product and transports them, appropriately indexed, to the packaging machines. In biscuit production, the width of the main belt is oriented toward the width of the oven. In the case of chocolate or chocolate bar production systems, the width of the main belts is oriented toward the width of the molds. Typical main belt widths therefore vary from 600 mm to sometimes more than 2000 mm.

Control belts receive the freshly produced naked products from the production belt in a synchronized manner, usually arranged as rows, and then deliver these rows of product to the packaging machine feed system. In doing so, it may be that the rows of product are formed and delivered on the production belt at varying speed. Likewise the rows of product can be formed and delivered as a closely grouped formation. This results in the task and function of a control belt. A control belt receives the rows of product or product formations from the production belt in a synchronized manner. Here, the delivery may occur at constant speed or at varying speed. The delivery of the rows of products to the packaging machine feed system lies on the one hand in the distortion-free transfer to a higher constant transport speed and, on the other, in the timely indexing or separation of the rows of product to the feed system. Indexing and separation is usually necessary with rows of product which are to be transferred from the production belt in formations.

Knowing the function and the location of such control belts results in the problem of contamination. Contamination is increased, as the freshly produced products are dynamically loaded onto these control belts. That is to say, the rows of product are accelerated and retarded. In doing so, slip and therefore abrasion can occur. Crumbs (product crumbs) or faulty (deformed) products in the transfer region often have to be taken into account. All this leads to increased contamination and, as a consequence thereof, to increased cleaning effort. This is because contamination is the cause of all kinds of efficiency losses. On the one hand, the loss can be the cleaning time, in which no production can take place, and, on the other, malfunctions and faults are the cause of increased rejects.

SUMMARY

The invention is based on the object of proposing a design solution of a functional belt in which the sensitivity to contamination and the cleaning effort or cleaning time are minimized.

A control belt as a preferred exemplary embodiment of the invention is described below with reference to the attached drawings.

DETAILED DESCRIPTION OF THE DRAWINGS

FIG. 1 shows a side view of a control belt according to the invention,

FIG. 2 shows a front view of the belt shown in FIG. 1.

PREFERRED EMBODIMENTS OF THE INVENTION

The control belt shown in the drawings has an endlessly circulating web 1 which runs through three line sections in the direction of the arrow 2: a top flat section 3 between a receiving-side deflector roll 4 and a delivery-side deflector roll 5, a section 7 running downward from the delivery-side deflector roll to a drive drum 6, and a section 8 running upward from the drive drum to the receiving-side deflector roll.

The drive drum has a shaft 9 which is mounted at its two ends in bearings 10. The bearings are arranged so that they can be moved vertically and are vertically movable by means of servo-controlled gear spindles 11. The web is tensioned by downward movement of the bearings and therefore of the drive drum, and slackened by upward movement, namely to such an extent that it can be removed. The web is tensioned and slackened in an automated and definitively reproducible manner by the servo control of the threaded spindles at both sides.

Instead of the threaded spindles, other embodiments, such as pneumatic or hydraulic systems for example, are also possible. However, these are not desirable in the foodstuffs sector.

The drive motor for the drive drum is centered on the drive shaft by force and is moved vertically together with the bearings.

A so-called belt edge guide is commonly used for defined and controlled straight running of the conveyor web. This prevents the web being able to wander to the side during production. For example, the web can wander due to the load of the conveyed product or due to increasing contamination. As a rule, the web is centered by a technically common cambering of the drive drum. In doing so, the drum has the largest diameter at the center of the belt. Its diameter reduces slightly toward the outside. In operation, the web is then always oriented toward the center, as the greatest web tension is present here.

However, as a result of contamination, external loading or deformation of the web, this effect can reduce and lead to wandering of the web. The position of the web edge perpendicular to the conveyor direction is detected as usual by a mechanical or sensory scanning of the web edge. If the web now drifts perpendicular to the conveyor direction, then this change in position of the web edge leads to a defined vertical movement of the bearings in the opposite direction. As a result, the drive drum is positioned at a defined angle and, as a result of this angled position, counteracts the wandering of the conveyor web. As a result of this ability of the drive drum to move vertically in the opposite direction, the belt edge control is very efficient, as the web tension on both sides of the web can be affected simultaneously and directly and the running of the web can therefore be controlled very quickly and precisely.

With this solution, the deflector rolls, which with known control belts typically lie on the outside for web tension and web guidance and which are likewise subject to contamination, are not required.

To enable a contaminated web to be changed without tools, the structural design of the belt chassis is left open on one side. For this purpose, the drive side is closed and is designed in a stable matter in such a way that even belt widths of over 2000 mm are self-supporting. A vertical face plate 13, which is additionally reinforced with stiffeners 14, is fixed to a base plate 12. A vertical strut 15, which extends internally within the web silhouette at right angles over the whole width of the belt, is fixed to the face plate. A fixing plate 16, to which one of the shaft bearings of the drive shaft, the vertical movement mechanism and the associated threaded spindles are fixed, is mounted on the open side of the chassis. As mentioned, the central design feature is that the whole mechanism is arranged on the open side of the chassis within the web silhouette.

As a result, after previous slackening, it is possible to remove the belt from the open side of the chassis without tools. Refitting the belt is equally simple and possible without tools. The belt tension can then be reactivated in that the vertical movement units arranged at both sides position the drive drum downward and, as a result, the web is once again reproducibly loaded with exactly the same tension.

The solution described for a control belt can readily be used for other types of functional belts and also for different forms of pure conveyor belts.

The invention claimed is:

1. A conveyor belt having for conveying products on a section of an endless web comprising;
   a deflector roll on each of a product receiving side and a product delivery side; and
   a drive drum, which is arranged below the deflector rolls and drives the web,
   wherein the deflector rolls and the drive drum are arranged within a triangular web silhouette perpendicular to a web running direction and are mounted in bearings on both sides of the belt, and
   wherein the bearings of the drive drum can be moved vertically and drive means are connected to the bearings in order to move them vertically.

2. The conveyor belt according to claim 1, further comprising a chassis which is open on one side, in which one shaft bearing and its adjustment mechanism are fixed to a strut running perpendicular through the web silhouette in such a way that the web can be removed on this side.

3. The conveyor belt according to claim 1, further comprising means for moving the bearings vertically in opposite directions if the web wanders to the side.

4. The conveyor belt according to claim 1, wherein a drive motor for the drive drum is centered on a shaft by force.

* * * * *